UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

RED TETRAZO DYE.

SPECIFICATION forming part of Letters Patent No. 516,759, dated March 20, 1894.

Application filed December 20, 1893. Serial No. 494,223. (Specimens.) Patented in France January 27, 1893, No. 227,474, and in England January 27, 1893, No. 9,183.

*To all whom it may concern:*

Be it known that I, JOHANN JAKOB BRACK, a citizen of the Swiss Republic, residing at Basle, Switzerland, have invented certain new and useful Improvements in the Production of Tetrazo Coloring-Matters, (partly patented in France by Letters Patent No. 227,474, dated January 27, 1893, and in England by Letters Patent No. 9,183, dated, under International Convention, January 27, 1893, date of application May 8, 1893,) of which the following is a specification.

This invention relates to the manufacture of new tetrazo-coloring matters which dye unmordanted cotton in an alkaline bath, and which are obtained by combining a naphtylamin sulfonic acid with the tetrazo-derivative of a diamido-base obtained by the condensation of formaldehyde with a paradiamin and the hydrochlorate of an aromatic diamin.

By way of examples, I will now describe the production of the red coloring matters obtained with alpha-naphtionic acid and the diamido bases derived from formaldehyde, tolidin and the hydrochlorate of tolidin or phenylendiamin.

I. *Production of the dye by combining alpha-naphtionic acid with the tetrazo-compound of the diamido-base derived from formaldehyde, tolidin and hydrochlorate of tolidin.*—The tetrazo-derivative obtained by diazotizing 4.3 kilos of the diamido-base, derived from one molecule of formaldehyde, one molecule of tolidin and one molecule of hydrochlorate of tolidin, by means of eight kilos of hydrochloric acid at 21° Baumé and 1.4 kilos of sodium nitrite, is poured into a solution containing 4.9 kilos of naphtionate of soda and eight kilos of acetate of soda, care being taken to agitate. After leaving the mass to stand for twelve hours, the product of the reaction is supersaturated with a solution of carbonate of soda; it is heated to ebullition and the coloring matter formed is precipitated by adding sea salt. After drying, this coloring matter appears as a red powder, dyeing unmordanted cotton, in an alkaline bath, a red tint or color. With concentrated sulfuric acid this coloring matter yields a violet colored solution. The coloring matter is easily soluble in water but only slightly soluble in alcohol. The probable constitutional formula of this coloring matter is as follows:

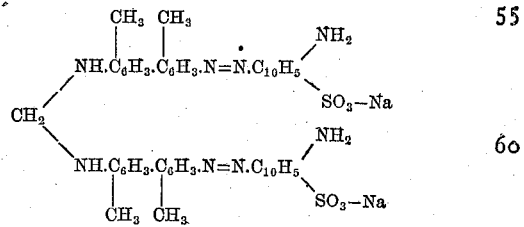

II. *Production of the dye by combining alpha-naphtionic acid with the tetrazo-derivative of the diamido-base derived from formaldehyde, tolidin and hydrochlorate of meta phenylendiamin.*—If in the preceding example, the 4.3 kilos of the diamido-base derived from formaldehyde, tolidin and tolidin hydrochlorate, be replaced by 3.3 kilos of the diamido-base resulting from the condensation of one molecule of formaldehyde, with one molecule of tolidin and one molecule of metaphenylendiamin hydrochlorate, there is obtained a substantive coloring matter which dyes unmordanted cotton red in an alkaline bath. The solution of the brick-red powder in concentrated sulfuric acid is gray blue with a reddish tinge. The coloring matter is easily soluble in water but is only slightly soluble in alcohol. Its probable formula is as follows:

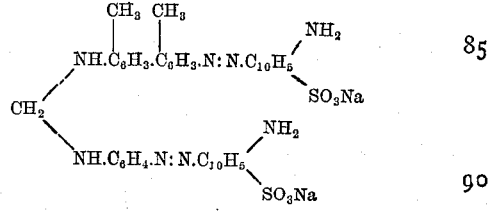

What I claim as my invention, and wish to secure by Letters Patent, is—

1. The herein described process for the manufacture of tetrazo-coloring matters which consists in combining two molecules of a naphtylamin-sulfonic acid with one molecule of the tetrazo-derivative of the diamido-base resulting from the condensation of equivalent quantities of formaldehyde, a paradiamin and the hydrochlorate of an aromatic diamin, as set forth.

2. The herein described process for the manufacture of tetrazo-coloring matters which consists in combining two molecules of naphtionic acid with one molecule of the tetrazo-derivative of the diamido-base resulting from the condensation of equivalent quantities of formaldehyde, tolidin and the hydrochlorate of an aromatic diamin, as set forth.

3. The herein described tetrazo-coloring matter, derived from alpha-naphtionic acid and the diamido-base resulting from the condensation of formaldehyde with tolidin and hydrochlorate of meta-phenylendiamin, which dyes unmordanted cotton a red tint or color, is a red powder and dissolves in concentrated sulfuric acid with a gray blue color, as set forth.

In witness whereof I have hereunto signed my name in the presence of two subscribing witnesses.

JOHANN JAKOB BRACK.

Witnesses:
  THEODORE STACHELIN,
  AMAND RITTER.